UNITED STATES PATENT OFFICE.

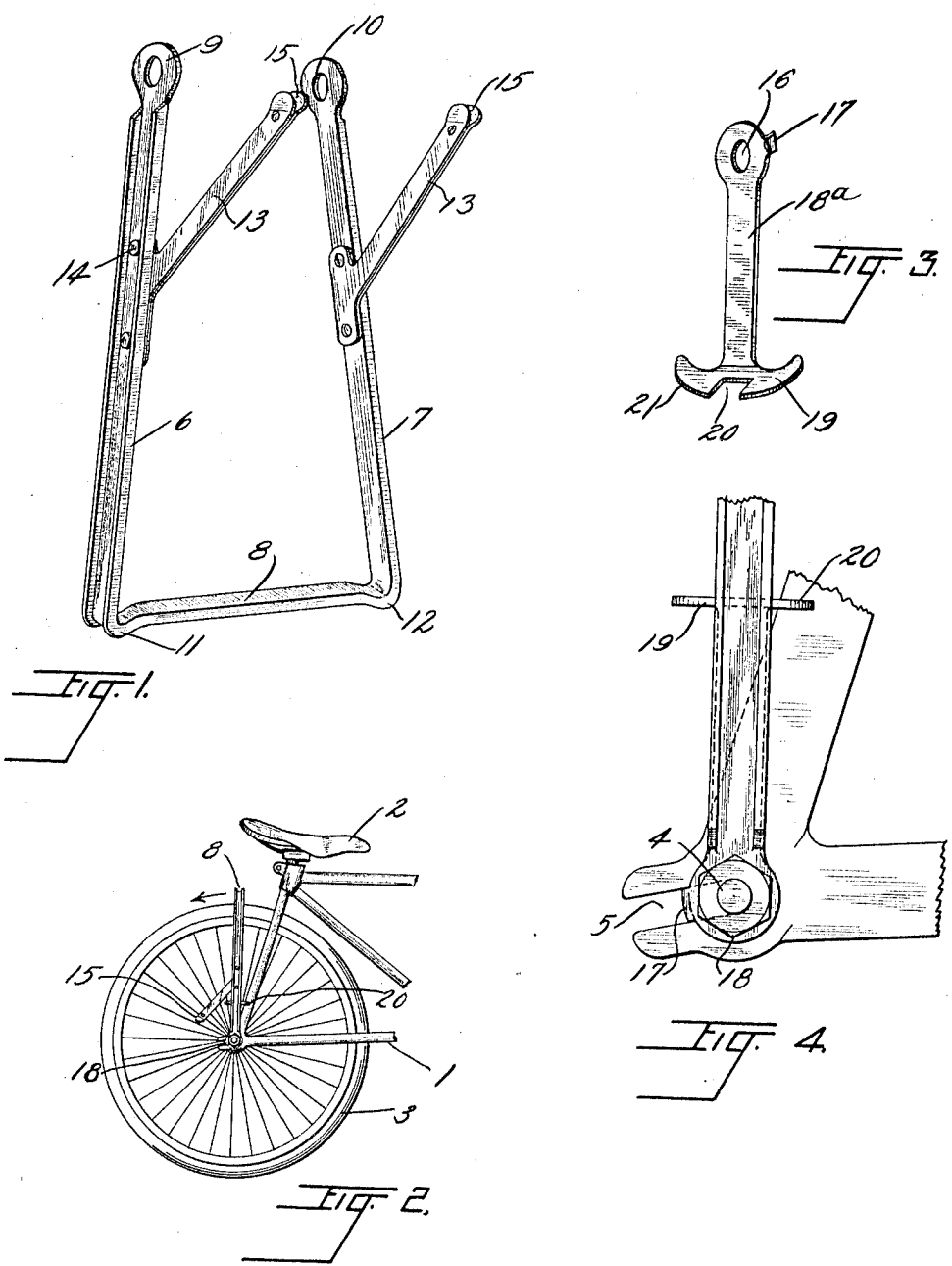

HENRY T. ADAMS, OF CHICAGO, ILLINOIS, ASSIGNOR TO HENRY T. ADAMS COMPANY, OF SOUTH CHICAGO, ILLINOIS.

BICYCLE-STAND.

1,061,513.  Specification of Letters Patent.  Patented May 13, 1913.

Application filed October 7, 1912. Serial No. 724,276.

*To all whom it may concern:*

Be it known that I, HENRY T. ADAMS, a citizen of the United States, and resident of Chicago, Cook county, Illinois, have invented certain new and useful Improvements in Bicycle-Stands, of which the following is a specification.

The primary object of this invention is to provide a new and useful stand which may be attached to a bicycle and which can be used for the purpose of holding the bicycle in upright position when the bicycle is not in use.

In the drawings, Figure 1 is a perspective view of the stand; Fig. 2 is a view showing the same applied to a bicycle, the stand being shown in the position in which it is carried when the bicycle is in use; Fig. 3 is a perspective view of the member which locks the movable parts in the position depicted in Fig. 1; and Fig. 4 is an enlarged detailed view of the parts when in the position shown in Fig. 2.

The bicycle, which may be of any ordinary construction, is depicted in the drawings as having a frame 1, saddle 2, and rear wheel 3, the wheel 3 being supported from the frame 1 by axle 4, which axle is received within the cavity or recess 5 formed at the junction of the horizontal and vertical arms of the frame. This construction is, of course, old and well known and no novelty or invention is claimed for the construction of the bicycle frame or the mounting of the wheel therein.

The stand comprises a substantially U-shaped member, best shown in Fig. 1 of the drawings. Said member is depicted in said figure as being a U-shaped stirrup having two vertical arms 6 and 7 cross connected by the arm 8, which arm 8 is substantially parallel to the ground. The arms 6, 7, and 8 of the stirrup may be formed of a channel iron, represented in Fig. 1, or of any other suitable piece of metal, and arms 6 and 7 both terminate in eyes or loops 9 which are perforated at 10. The axle 4, which supports the rear wheel, passes through said eyes 10 and the stirrup is permitted to rotate upon said axle, though the extent of rotation is limited to about 180 degrees of arc. When the parts are in the position depicted in Fig. 2 of the drawings, the stirrup will be held out of the way and the bicycle can be ridden, but if the stirrup be caused to rotate upon the axle 4, the arm 8 will be below the wheel 3 and will rest upon the ground, thus supporting the rear wheel above the ground. The knuckles 11 and 12 will rest upon the ground and will keep the bicycle from tipping over.

To each arm 6 and 7 the braces 13 are bolted or riveted at 14. At their outer ends said braces are provided with a yoke or socket 15 and when the stirrup is moved to the position diametrically opposite to that shown in Fig. 2, the yokes at the ends of the braces 13 will catch against the horizontal arm of the frame 1.

In order to hold the stirrup in the inoperative position depicted in Fig. 2, the clamp, best shown in Fig. 3, is provided. Said clamp consists of a piece of spring metal having an eye 16 in one end. Through this eye 16 the axle 4 is adapted to pass, while the ear 17 fits into the recess 5 so that when the nut 18 is at the outer end of the axle 4, the clamp, shown in Fig. 3, will be held upright in the position best shown in Figs. 2 and 4, and will be locked against rotation because of the seating of the tongue 17 in the recess 5. The stirrup, shown in Fig. 1, immediately engages the locking member 18$^a$. Said member 18$^a$ is provided at the end opposite perforation 16 with a flange 19 notched at 20, the edge of the flange 19 being curved at 21. When the stirrup is moved to the position shown in Figs. 2 and 4, the arm 6 will ride over the curved edge 21 and will seat in the notch 20 and in this manner the stirrup can be held in upright position as long as desired. When the operator wishes to drop the stirrup so that the cross bar 8 is below the wheel 3, instead of thereabove, he simply pushes the clamp 18$^a$ away from the arm 6 so that said arm is no longer seated in the notch 20; after which the stirrup is permitted to rotate upon its axle and move to operative position.

It should be noted that the device for holding the locking member 18 against rotation is only one way of holding said member in the same position and also that many other changes in the details of construction and arrangement of parts may be made without departing from the scope of the invention. Preferably the member 18$^a$ is retained between the stirrup and the frame 1, but said member may be placed in any other position which permits either arm 6 or 7 of the stirrup to ride into the notch 20.

I claim as my invention:

1. A support for bicycles or the like comprising a stirrup, a pivot upon which said stirrup is adapted to rotate, and a spring-like clamp provided with a notch into which said stirrup is adapted to ride, said spring-like clamp being at all times locked in fixed position.

2. A support for bicycles and the like comprising a stirrup, a pivot upon which same is adapted to rotate, a spring-like clamp adapted to be retained upon the same pivot as said stirrup, said spring-like clamp having a flange provided with a locking notch into which said stirrup is adapted to ride, and means for locking said spring-like clamp against rotation upon said pivot.

3. A support for bicycles and the like comprising a stirrup adapted to swing upon the axle of the vehicle, a spring-like clamp intermediate said stirrup and the framework of the vehicle, and means for locking said spring-like clamp to said framework, said clamp being provided with a flange having a notched edge, the stirrup being adapted to seat in the notch upon said edge.

In testimony whereof I have hereunto affixed my name in the presence of two witnesses.

HENRY T. ADAMS.

Witnesses:
GEORGE H. MEISER,
FRANK FARNUM.

Copies of this patent may be obtained for five cents each, by addressing the "Commissioner of Patents, Washington, D. C."